(12) United States Patent
Ayoub et al.

(10) Patent No.: US 10,146,749 B2
(45) Date of Patent: Dec. 4, 2018

(54) TRACKING JAVASCRIPT ACTIONS

(71) Applicant: International Business Machines Corporation, Armonk, NY (US)

(72) Inventors: Khalil A. Ayoub, Ottawa (CA); Gregor V. Bochmann, Ottawa (CA); Nevon C. Brake, Ottawa (CA); Mustafa E. Dincturk, Ottawa (CA); Paul Ionescu, Kanata (CA); Guy-Vincent Jourdan, Ottawa (CA); Iosif V. Onut, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 14/590,438

(22) Filed: Jan. 6, 2015

(65) Prior Publication Data

US 2015/0193402 A1 Jul. 9, 2015

(30) Foreign Application Priority Data

Jan. 9, 2014 (CA) ...................................... 2838911

(51) Int. Cl.
*G06F 3/0484* (2013.01)
*G06F 17/22* (2006.01)
*G06F 17/30* (2006.01)

(52) U.S. Cl.
CPC .... *G06F 17/2247* (2013.01); *G06F 17/30893* (2013.01); *G06F 17/30911* (2013.01)

(58) Field of Classification Search
CPC ............. G06F 17/30861; G06F 3/0484; G06F 17/30864
See application file for complete search history.

(56) References Cited

U.S. PATENT DOCUMENTS 8,230,002 B2 7/2012 Wang et al.
8,555,157 B1 * 10/2013 Fu ..................... G06F 17/30893
715/201

(Continued)

FOREIGN PATENT DOCUMENTS

EP 2431893 A1 3/2012

OTHER PUBLICATIONS

Canadian Patent Application No. 2838911 filed Jan. 9, 2014.

*Primary Examiner* — Stephen Hong
*Assistant Examiner* — Ahamed I Nazar
(74) *Attorney, Agent, or Firm* — Gilbert Harmon, Jr.

(57) ABSTRACT

An embodiment for tracking JavaScript actions in a rich Internet application, receives a document object model (DOM) representative of a particular page of an application at a particular time and analyzes the DOM received to identify each JavaScript action on the particular page for which each JavaScript action identified, a JavaScript action characteristics ID is calculated and stored. Responsive to a determination multiple instances of a same ID exist, collecting a list of JavaScript actions corresponding to each ID corresponding to a multiple JavaScript action and removing from memory JavaScript action entries for the multiple instances of the same ID. A neighbor influence is computed for a member of the list of JavaScript actions remaining and the JavaScript action ID calculated for the member of the list of JavaScript actions remaining is stored. Responsive to a determination there are no more multiple JavaScript actions, return all JavaScript action IDs stored.

17 Claims, 15 Drawing Sheets

(56) References Cited

U.S. PATENT DOCUMENTS

| | | | |
|---|---|---|---|
| 2009/0292984 A1 | 11/2009 | Bauchot et al. | |
| 2009/0327858 A1* | 12/2009 | Tsun | G06Q 30/02 715/234 |
| 2010/0076954 A1 | 3/2010 | Dulitz et al. | |
| 2010/0185644 A1* | 7/2010 | Gutt | G06F 17/30864 707/759 |
| 2012/0005211 A1* | 1/2012 | Ayoub | G06F 17/3089 707/737 |
| 2012/0166936 A1 | 6/2012 | Ayoub et al. | |
| 2012/0204091 A1* | 8/2012 | Sullivan | G06F 11/3664 715/234 |
| 2012/0278699 A1* | 11/2012 | Benjamin | G06F 17/2247 715/234 |
| 2013/0332444 A1* | 12/2013 | Kondratova | G06F 17/30867 707/709 |
| 2013/0346387 A1* | 12/2013 | Ayoub | G06F 17/30867 707/709 |
| 2014/0053089 A1* | 2/2014 | von Bochmann | G06F 3/0484 715/760 |
| 2014/0195510 A1* | 7/2014 | Jourdan | G06F 17/30864 707/710 |
| 2014/0208195 A1* | 7/2014 | Ayoub | G06F 17/2247 715/234 |

\* cited by examiner

600

1. Compute JavaScript Action Characteristics ID(JavaScript Action)
2. Begin
3.    Input: The JavaScript Action
4.    Output: the ID of the JavaScript Action
5.    Node X = the HTML node that the JavaScript Action is defined on
6.    ID = Name of the JavaScript Action Attribute + Delimiter + Compute Node Characteristics ID(Node X)
7.    Return hash(ID) ~ 602
8. End
9. Compute Node Characteristics ID(Node X)
10. Begin
11.    Input: The Node X
12.    Output: the ID of the Node X
13.    ID = Name of the HTML Element ~ 604
14.    Loop over all stable attributes ~ 606
15.    Begin
16.      If Node X has the current Stable Attribute Y
17.      Begin
18.        ID += Delimiter + Stables Attribute Name + Delimiter + Stable Attribute Value
19.      End
20.    End
21.    ID+= Inner text of Node X
22. 
23.    Return ID;
24. End

1. Compute Element Neighbour Influences(List of JavaScript Actions)
2. Begin
3.     Input: list of JavaScript Actions that have the same ID based on the Element's characteristics ~1202
4.     Output: list of JavaScript Action IDs
5.     JavaScript Action X= Input[0]; // the first JavaScript action from the given list of JavaScript Action
6.     Node X= the node that has the JavaScript Action X ~1204
7.     Construct a Searching Tree rooted in Node X using the current DOM Tree. ~1206
8.     Perform a breath first search on the new tree until the stop condition is satisfied
9.     Begin ~1208
10.        Let Node Y = current node in the Search Tree
11.        Let Relative XPath XY = the relative xpath used to navigate in the original DOM from Node X to Node Y
12.        List of IDs = {};

13.        For all JavaScript Actions in the given List of JavaScript Actions
14.        Begin
15.            Let Node Z = the node of the current JavaScript Action
16.            Let Node W = the node that is identified by the Relative XPath XY when navigating from Node Z
17.            If Node W does not exist
18.            Begin
19.                Continue the breath first search because Node Y is not a good identifier of Node X
20.            End
21.            List of IDs += Compute Node Characteristics ID (Node W)
22.        End
23.        If List of IDs contains duplicates
24.        Begin
25.            Continue the breath first search because Node Y is not a good identifier of Node X
26.        End
27.        Else
28.        Begin
29.            Finish the breath first search with success
30.        End
31.     End
32.     If the breath first search finished with success
33.     Begin
34.        $ID_{JavaScript}$ = Compute JavaScript Action Characteristics ID(JavaScript Action X) ~1210

35.        For each ID in the List of IDs
36.        Begin
37.            ID = hash($ID_{JavaScript}$ + Delimiter + Relative XPath XY + Delimiter + ID)
38.        End
39.     End
40.     Return List of IDs
41. End

FIG. 12

TRACKING JAVASCRIPT ACTIONS

BACKGROUND

1. Technical Field

This disclosure relates generally to identifying elements of a web page in a data processing system and more specifically to tracking JavaScript actions in a rich Internet application in the data processing system.

2. Description of the Related Art

XPath is a widely used solution to a problem of uniquely identifying a hypertext markup language (HTML) element in a document object model (DOM). The XPath works well when the HTML content of a particular page is static. However, when the HTML content of the particular page is dynamic, or the page is visited on two different times, for example, the same page at two different timestamps, uniquely tracking an HTML element in the page becomes impossible using XPath because of high probability the XPath is no longer valid.

Validity is questionable because as a new element is introduced in the DOM, elements in the DOM are re-shuffled, and elements in the DOM are deleted. JavaScript actions are associated with HTML elements. The inability to uniquely identify HTML nodes in time (two different timestamps) prevents applications from also uniquely identifying associated JavaScript actions in time (two different timestamps).

In essence, a problem arises in an inability to uniquely map JavaScript actions from one DOM to a different DOM, to enable a crawler to determine JavaScript actions common between the two DOMs, and therefore which actions are new and which actions have been deleted.

Monitoring JavaScript actions on the particular page is required to enable automatic identification of portions of the particular page previously explored in contrast with other portions. For rich Internet applications (RIA) and Web 2.0 applications the particular problem is even more common, due to JavaScript actions executed on the page, and due to the actions typically causing a change in portions of the page. For example, sorting a table, moving/minimizing/maximizing portlets, adding an item in a shopping cart, or automatically updating news on a newspaper website all of which lead to changes on the page. A respective DOM experiences common modifications that are an intrinsic characteristic of dynamic web applications, including RIA and Web 2.0 applications in which typical modifications comprise deletion of one or more DOM elements, addition of one or more DOM elements, a move of one or more DOM elements or sorting of DOM elements.

SUMMARY

According to one embodiment, a computer-implemented method for tracking JavaScript actions in a rich Internet application receives a document object model (DOM) representative of a particular page of an application at a particular time, analyzes the DOM received to identify each JavaScript action on the particular page, calculates, for each JavaScript action identified, a JavaScript action characteristics ID and stores the JavaScript action characteristics ID calculated. The computer-implemented method further determines whether multiple instances of a same ID exist, using the JavaScript action characteristics ID stored and responsive to a determination multiple instances of a same ID exist, for each ID corresponding to a multiple JavaScript action, collects a list of JavaScript actions corresponding to a current ID.

The computer-implemented method further removes from memory JavaScript action entries for the multiple instances of the same ID, computes a neighbor influence for a member of the list of JavaScript actions remaining and stores the JavaScript action ID calculated for the member of the list of JavaScript actions remaining.

The computer-implemented method further determines whether there are more multiple JavaScript actions and responsive to a determination there are no more multiple JavaScript actions, returns all JavaScript action IDs stored.

According to another embodiment, a computer program product for tracking JavaScript actions in a rich Internet application comprises a computer readable storage device containing computer executable program code stored thereon. The computer executable program code comprises computer executable program code for receiving a document object model (DOM) representative of a particular page of an application at a particular time; computer executable program code for analyzing the DOM received to identify each JavaScript action on the particular page; computer executable program code for calculating, for each JavaScript action identified, a JavaScript action characteristics ID; computer executable program code for storing the JavaScript action characteristics ID calculated; computer executable program code for determining whether multiple instances of a same ID exist, using the JavaScript action characteristics ID stored; computer executable program code responsive to a determination multiple instances of a same ID exist, for each ID corresponding to a multiple JavaScript action, for collecting a list of JavaScript actions corresponding to a current ID; computer executable program code for removing from memory JavaScript action entries for the multiple instances of the same ID; computer executable program code for computing a neighbor influence for a member of the list of JavaScript actions remaining; computer executable program code for storing the JavaScript action ID calculated for the member of the list of JavaScript actions remaining; computer executable program code for determining whether there are more multiple JavaScript actions; and computer executable program code responsive to a determination there are no more multiple JavaScript actions, for returning all JavaScript action IDs stored.

According to another embodiment, an apparatus for tracking JavaScript actions in a rich Internet application comprises a communications fabric; a memory connected to the communications fabric, wherein the memory contains computer executable program code; a communications unit connected to the communications fabric; an input/output unit connected to the communications fabric; a display connected to the communications fabric; and a processor unit connected to the communications fabric. The processor unit executes the computer executable program code to direct the apparatus to receive a document object model (DOM) representative of a particular page of an application at a particular time; analyze the DOM received to identify each JavaScript action on the particular page; calculate, for each JavaScript action identified, a JavaScript action characteristics ID; store the JavaScript action characteristics ID calculated; determine whether multiple instances of a same ID exist, using the JavaScript action characteristics ID stored; responsive to a determination multiple instances of a same ID exist, for each ID corresponding to a multiple JavaScript action, collect a list of JavaScript actions corresponding to a current ID; remove from memory JavaScript action entries for the multiple instances of the same ID; compute a neighbor influence for a member of the list of JavaScript actions remaining; store the JavaScript action ID calculated for the member of the list of JavaScript actions remaining; determine whether there are more multiple JavaScript actions; and responsive to a determination there are no more multiple JavaScript actions, return all JavaScript action IDs stored.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 6 is a code snippet representing identification of JavaScript action characteristics in accordance with one embodiment of the disclosure;

FIG. 12 is a code snippet representing finding a closest HTML element that uniquely identifies a set of IDs using the JavaScript action identification system of FIG. 3 in accordance with one embodiment of the disclosure;

DETAILED DESCRIPTION

Figure 1:
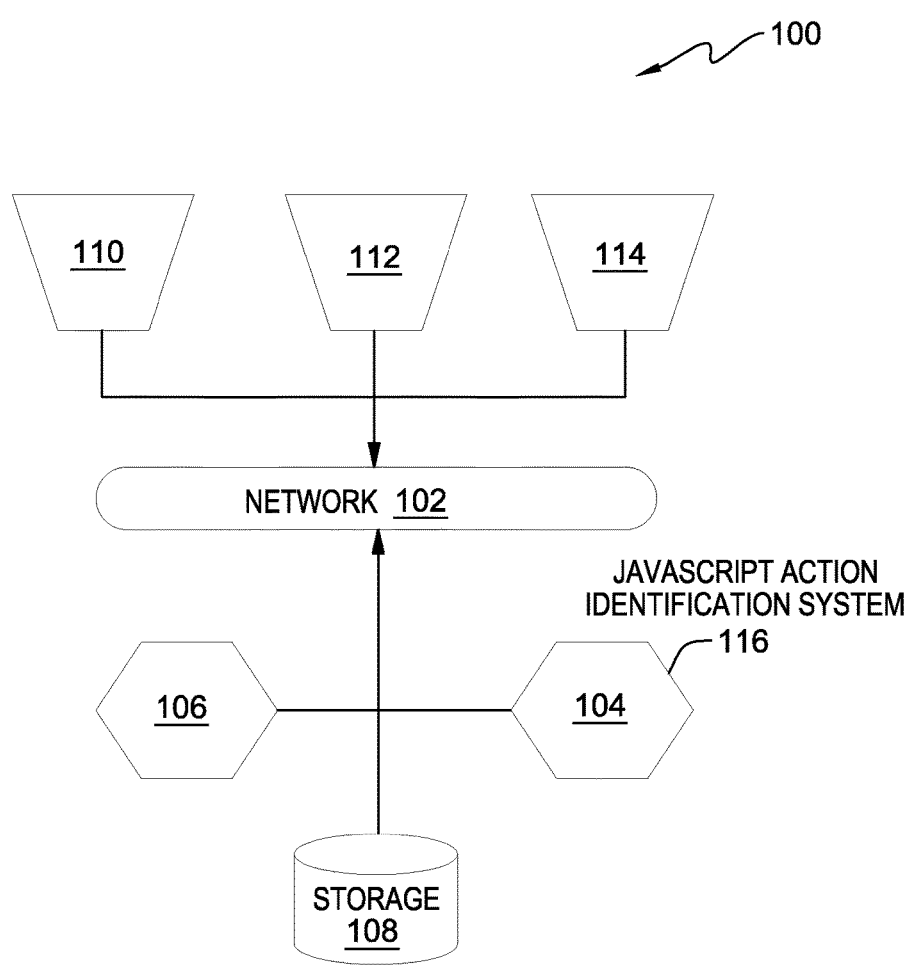
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle Corporation, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
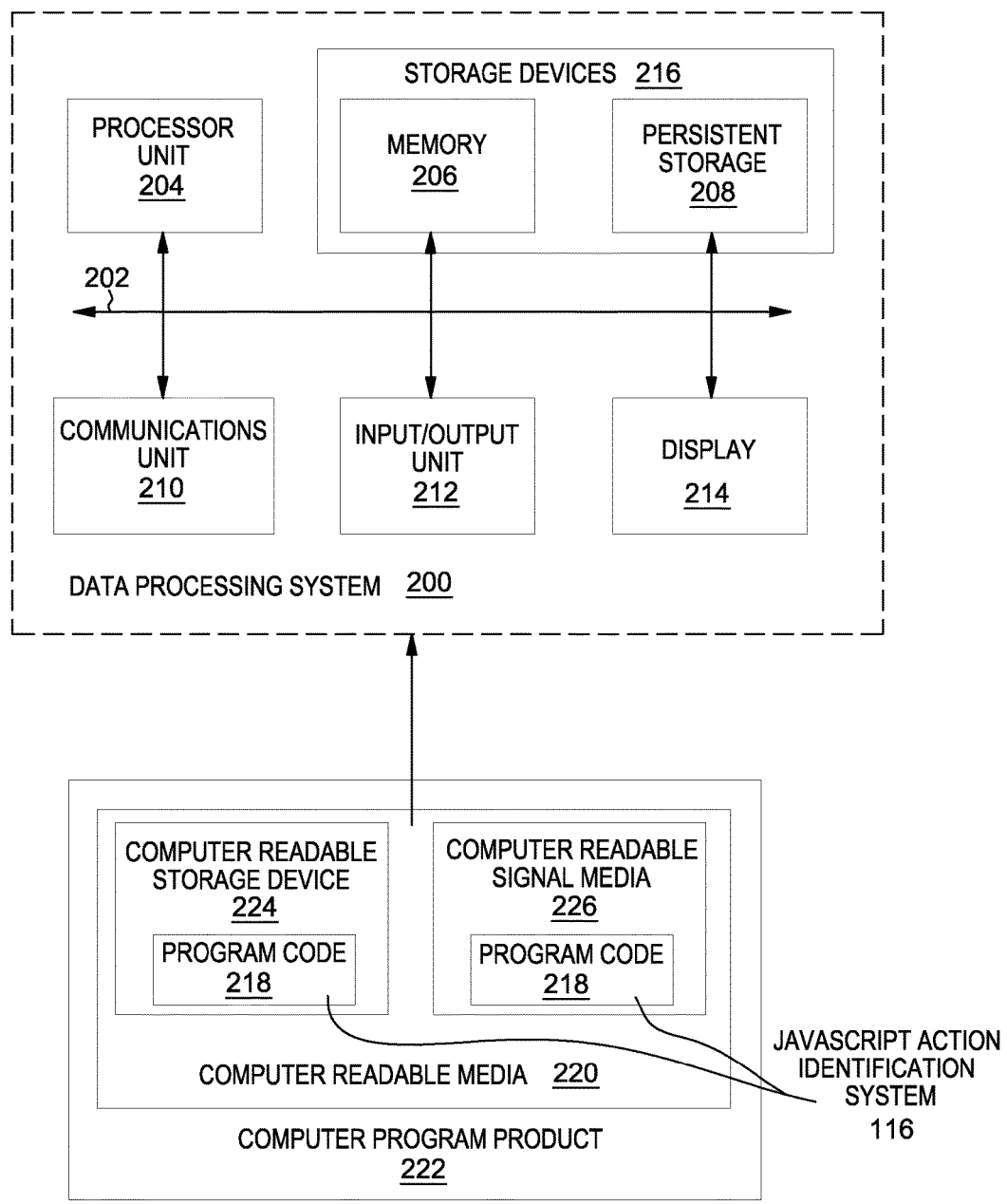
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). JavaScript action identification system 116 is an example of a collection of functional elements providing a capability of the disclosed process, and is discussed further with reference to FIG. 3. FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media or a computer readable storage device 224. In some instances, computer readable media 220 may not be removable.

Alternatively, program code 218 may be transferred to data processing system 200 from computer readable storage media 220 through a communications link to communications unit 210 and/or through a connection to input/output unit 212 using computer readable signal media 226. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for tracking JavaScript actions in a rich Internet application is presented. Processor unit 204, receives a document object model (DOM) representative of a particular page of an application at a particular time, analyzes the DOM received to identify each JavaScript action on the particular page, calculates, for each JavaScript action identified, a JavaScript action characteristics ID and stores the JavaScript action characteristics ID calculated.

Processor unit 204 further determines whether multiple instances of a same ID exist, using the JavaScript action characteristics ID stored and responsive to a determination multiple instances of a same ID exist, for each ID corresponding to a multiple JavaScript action, collects a list of JavaScript actions corresponding to a current ID.

Processor unit 204 further removes from memory JavaScript action entries for the multiple instances of the same ID, computes a neighbor influence for a member of the list of JavaScript actions remaining and stores the JavaScript action ID calculated for the member of the list of JavaScript actions remaining.

Processor unit 204 determines whether there are more multiple JavaScript actions and responsive to a determination there are no more multiple JavaScript actions, returning all JavaScript action IDs stored.

Using XPATH to identify HTML elements of a web page is an already known, trivial method. Embodiments of the disclosed method, in contrast, provide a capability, which is an alternative to XPATH based identification as previously used. Embodiments of the disclosed method provide a capability to identify individual DOM elements together with associated respective events. Embodiments of the disclosed method accordingly provide a capability to recognize a previously identified individual DOM element when encountered in different DOM-trees by determining whether two (syntactically) distinct actions defined in two different DOMs are equivalent.

Figure 3:
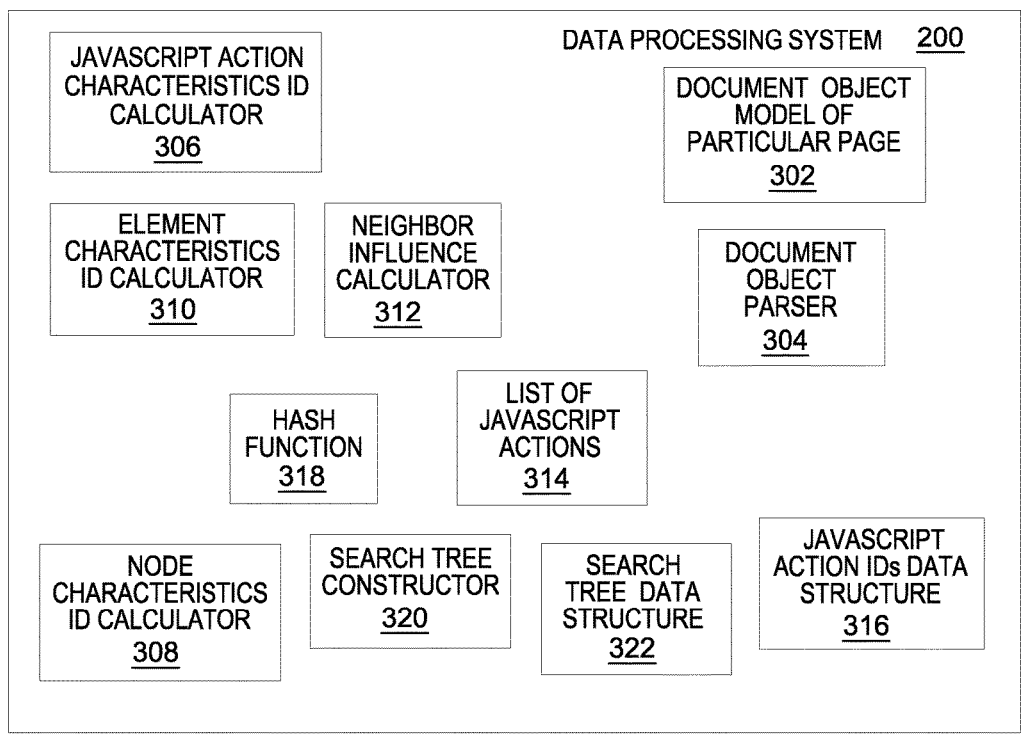
FIG. 3 is a block diagram representation of a JavaScript action identification system operable for various embodiments of the disclosure.

With reference to FIG. 3 a block diagram of JavaScript action identification system operable for various embodiments of the disclosure is presented. JavaScript action identification system 116 is an example of a collection of functional elements providing a capability of the disclosed process. The components depicted may be more or fewer as needed by a particular embodiment of the disclosed process without loss of function or capability.

JavaScript action identification system 116 leverages an underlying data processing system such as data processing system 200 of FIG. 2 to provide support typical of a data processing for other subsystems, systems and applications. JavaScript action identification system 116 comprises a number of functional components including Document Object Model of a particular page 302, Document Object Model parser 304, JavaScript action characteristics ID calculator 306, Node characteristics ID calculator 308, Element characteristics ID calculator 310, Neighbor influence calculator 312, List of JavaScript actions 314, JavaScript action IDs data structure 316, Hash function 318, Search tree constructor 320, and Search tree data structure 322.

Document Object Model of a particular page 302, also referred to as a DOM, provides an application programming interface (API) for data comprising conformant HTML and XML documents. A DOM accordingly defines a logical structure of the document using a tree structure and therefore the manner in which the document may be accessed and managed. Typically extensible markup language (XML) is used to represent many different kinds of information as documents, and the DOM therefore is used to manage the data.

Document Object Model parser 304, provides a capability to traverse XML trees, representative of a DOM and to access the created data structure to perform insert and delete operations on selected nodes. Source information defined in a document described using XML is first processed by Document Object Model parser 304, which reads the XML document definitions and converts the definitions into an XML DOM object. The XML DOM object is loaded into memory to enable further processing.

JavaScript action characteristics ID calculator 306, provides a capability of generating a string of a predefined format comprising an identifier associated with each particular JavaScript action identified on a web page in combination with one or more JavaScript action attribute names and one or more respective computed node characteristics identifier, in which elements of the string are separated by predefined delimiters.

Node characteristics ID calculator 308, provides a capability of generating a string of a predefined format comprising an identifier associated with each particular HTML tag or XML tag identified on a web page in combination with one or more stable attribute names and one or more respective stable attribute values, in which all elements of the string are separated by predefined delimiters.

Element characteristics ID calculator 310, provides a capability of generating an identifier using the element characteristics for a given JavaScript Action.

Neighbor influence calculator 312, provides a capability of generating identifiers of a given set of JavaScript actions using neighbor influences. Neighbor influence calculator 312 finds the closest element in a DOM to a particular JavaScript event that uniquely distinguishes between JavaScript events.

List of JavaScript actions 314 is a data structure providing a capability to save one or more previously identified JavaScript actions associated with a particular DOM.

JavaScript actions IDs data structure 316, provides a capability of storing previously computed JavaScript actions identifiers and associated JavaScript actions.

Hash function 318, is a selected one of any generally available functions capable of generating output data of a predetermined fixed length representation of original data as a shorter length reference to the original data received as input.

Search tree constructor 320, is a selected one of any generally available constructors providing a capability of generating a binary tree data structure suitable for searching.

Search tree data structure 322, is a binary tree data structure. The nodes of the binary tree data structure store data values from an ordered set of data values, derived from the DOM. Accordingly, in-order traversal of the tree visits each of the nodes in ascending order of the stored values.

Figure 4:
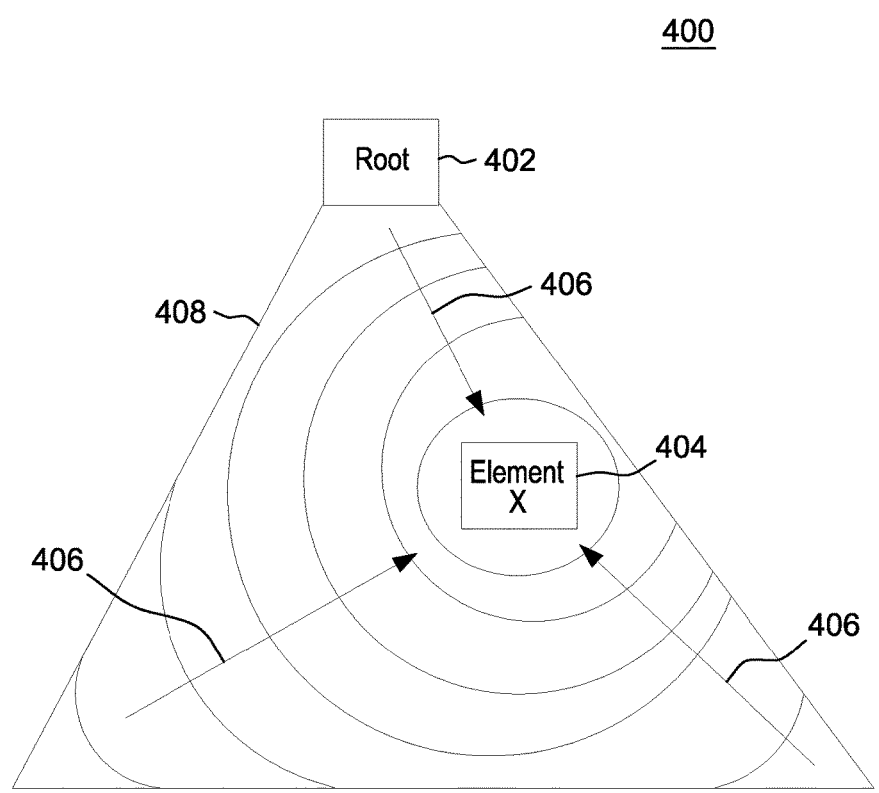
FIG. 4 is a block diagram of neighbor influence on an element operable for various embodiments of the disclosure.

With reference to FIG. 4 a block diagram of neighbor influence on an element operable for various embodiments of the disclosure is presented. Neighbor influence 400 is an example of a graphic representation of identifying and indicating relevance of an element through use of relative positioning operable for various embodiments of the disclosure.

Certain characteristics of DOM elements unlikely to change in time (between two different timestamps) include elements comprising element name (HTML tag name), element ID (when present), JavaScript code snippet of a mouse or keyboard event as a target of identification, attributes used by assisting technology tools such as alt, title along with respective values (these attributes are referred to as stable attributes), other JavaScript attributes and values for a current HTML node (these attributes are also stable attributes) and the number or count of stable attributes.

A relative position of DOM elements, within an influence area 408, including a sibling/parent relationship becomes important in direct proportion with proximity to an HTML element that is a target for unique identification. In the example using neighbor influence 400 element X 404 represents an HTML element that is a target for unique identification on a particular page. The further away from element X 404, the less relevant the information is with respect to element X. For example, going from any DOM element in an ancestor chain eventually leads to root 402 of the page; however root 402 is irrelevant in the context of identifying any element of the page since it is a shared ancestor. The same observation applies to the children of element X 404. The further away from element X 404, the less relevant the information in those children becomes for identifying element X 404. The arrows 406 indicate the direction of increased relevance with respect to element X 404 representing an HTML element that is a target for unique identification on a particular page.

In contrast, an XPath, does not capture these features, but rather, an XPath captures an absolute location of a particular feature on the page, within the tree of DOM elements. Therefore, a slightest modification of the DOM in time will cause some of the elements to move and associated absolute positions to change; therefore obviating use of an XPath to dynamically track features on the page.

To compute a unique ID representing an HTML element that is a target for unique identification on a particular page accordingly requires computing a unique ID using the characteristics of the element for each JavaScript action on the page. However for those JavaScript actions where the element characteristics are insufficient to uniquely distinguish between the elements, use the neighbor influences to compute the unique ID.

Figure 5:
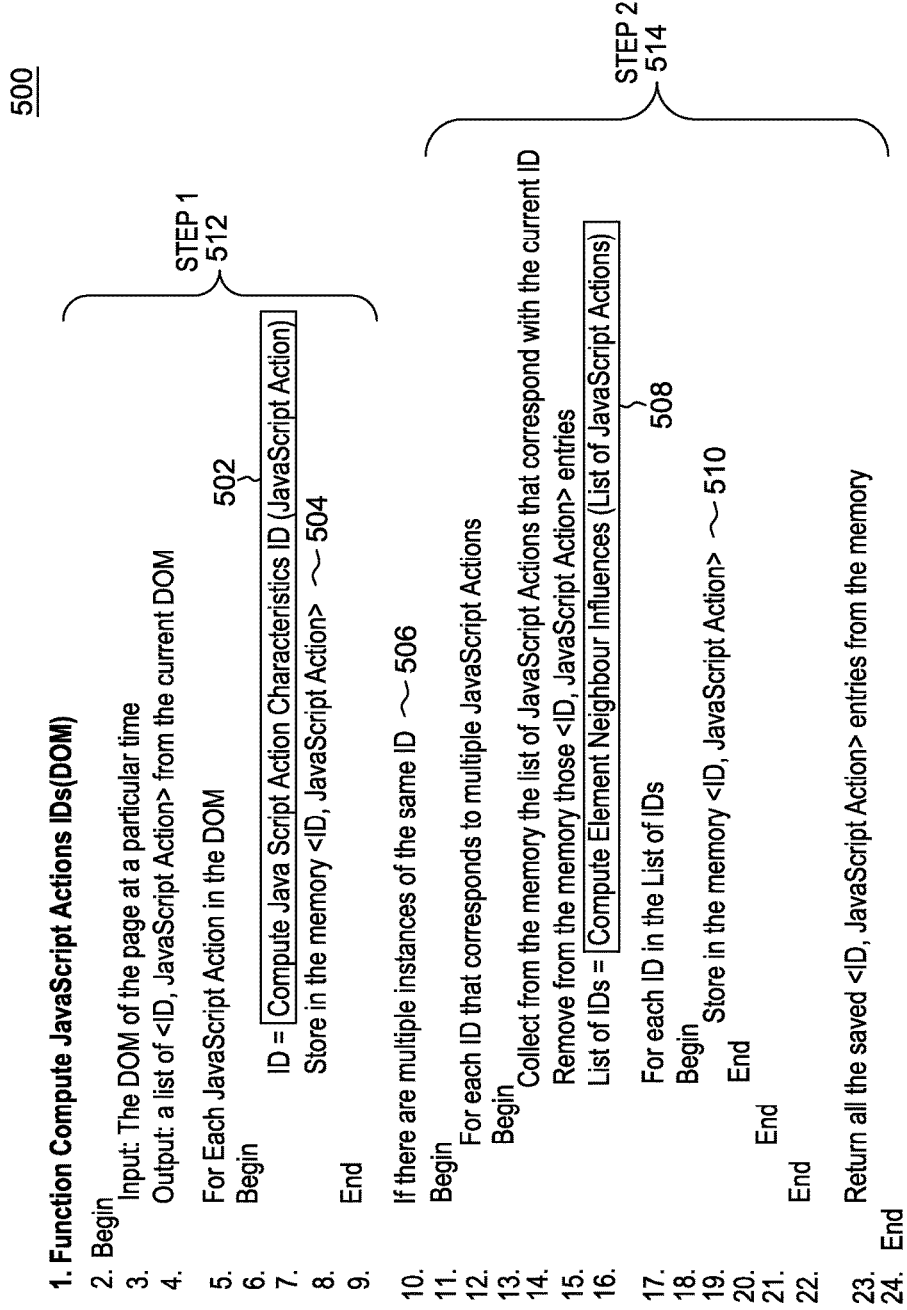
FIG. 5 is a code snippet representing a high level view of a method using a JavaScript action identification system of FIG. 3 in accordance with one embodiment of the disclosure.

With reference to FIG. 5 a code snippet representing a high level view of a method using a JavaScript action identification system of FIG. 3 in accordance with one embodiment of the disclosure is presented. Process 500 is an example of using the JavaScript action identification system 116 of FIG. 3.

In code snippet 500, compute element characteristics ID as in statement 502 is used to compute an ID using the element characteristics for a given JavaScript Action. Compute element neighbor influences of statement 508 indicates compute element neighbor influences is used to compute the IDs of the given set of JavaScript actions using a neighbor influences process. Statement 510 stores the JavaScript action ID calculated.

In the instance when multiple JavaScript Actions yield a same ID, only one occurrence is saved in the memory, as in statement 504; therefore, making all instances equal. This intermediate result is undesirable, since process 500 purports to uniquely identify every event encountered. The multiple JavaScript Actions which yield a same ID accordingly triggers statement 506 on line 10 "If there are multiple instance of the same ID"; which in turn triggers the process described in Step 2 514.

In code snippet 500, statements that are numbered 2-9 represent Step 1 512 and statements numbered 10-22 represent Step 2 514 in the overall process disclosed. In the instance when multiple JavaScript Actions yield to the same ID, only one occurrence is saved in the memory, as in line 8 (or statement 504). This action is undesirable, because every event should be uniquely identified. This will trigger the statement on line 10 or statement 506 of "If there are multiple instance of the same ID" which in turn triggers the process described in Step 2 514.

With reference to FIG. 6 a code snippet representing identification of JavaScript action characteristics operable for various embodiments of the disclosure is presented. Code snippet 600 represents a first step in a series of operations as recited statement 502 in process 500 of FIG. 5.

Statement 602 indicates use of a hash function can be implemented using any type of hashing mechanism including MD5, and checksum. Statement 604 indicates the name of the HTML element is also known as the html tag name. Statement 606 recites to loop over the list of stable attributes. The list of stable attributes is based on predetermined expert knowledge and is provided as input to the process. The current node may have only a portion of attributes in the list of stable attributes.

For example, considering a following list of stable attributes {href, id, onclick, ondoubleclick, title}, computing the ID of the onclick action for the following HTML element: <a href="Statistics.aspx" title="View Statistics" id="tl02_ListNameLink" style="background-color: #FFFFFF;" onclick="displayStats( );">Display</a> yields onclick, a, href Statistics.aspx, id, tl02_ListNameLink, onclick, displayStats( ); title, View Statistics, Display corresponding to the values of event name, element tag, href attribute name, href attribute value, id attribute name, id attribute value, onclick attribute name, onclick attribute value, title attribute name, title attribute value, and text of the html element respectively.

In an alternate embodiment, to improve processing speed, the embodiment of the disclosed process may be further restricted to those HTML nodes in the DOM containing at least one reliable attribute, or in an even more restrictive embodiment, to the HTML nodes in the DOM that contain a specific attribute (for example, the HTML ID attribute).

Figure 7:
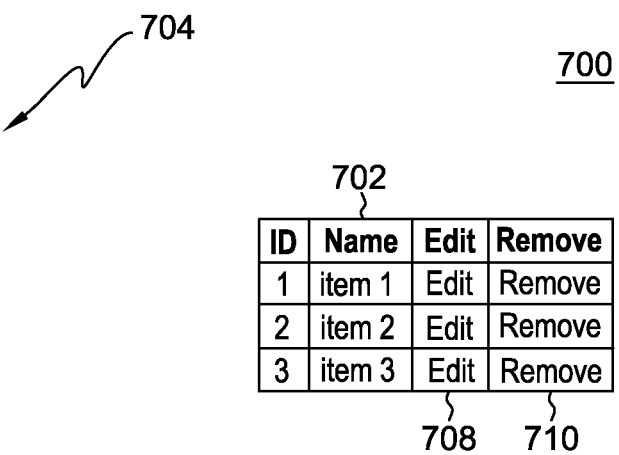
FIG. 7 is an example of uniquely distinguishing between similar events in the JavaScript action identification system of FIG. 3 in accordance with one embodiment of the disclosure.

With reference to FIG. 7 an example of uniquely distinguishing between similar events in the JavaScript action identification system of FIG. 3 operable for various embodiments of the disclosure is presented.

Example 700 represents an example using a web page in which applying only step 1 512 in a process as defined in code snippet 500 of FIG. 5 is not sufficient because at this point in the process occurrences of multiples of a JavaScript Action yield a same ID. A further step, as in step 2 514 in code snippet 500 of FIG. 5 is executed when encountering situations in which using the ID of the node that contains the JavaScript action (for example, Node X) is not enough. Because, in this example, there are multiple JavaScript actions in the page having the same ID, there is a requirement to identify the closest node to uniquely distinguish among the multiple JavaScript events. Executing step 2 514 as in code snippet 500 of FIG. 5 enables the process to uniquely identify the various JavaScript action events.

Example 700 represents an example of a HTML page wherein applying Step 1 of the disclosed method is not sufficient (because the intermediate results yield to the same event IDs). In this example, applying Step 2 enables the disclosed method to uniquely identify the events. In using the example of table 702, HTML code 704 for the table recites all the Edit cells 708 of the table have exactly the same JavaScript Event IDs since <td onclick='edit(getRowID);' style='color:blue'>Edit</td> yields the following ID (computed based on the process at step 1 508 of FIG. 5) onclick, td, onclick, edit(getRowID); Edit. Remove cells 710 are also noted.

Given this, a crawler cannot uniquely distinguish between the Edit events, but it will have the following 3 ids:
  1: onclick, td, onclick, edit(getRowID); Edit
  2: onclick, td, onclick, edit(getRowID); Edit
  3: onclick, td, onclick, edit(getRowID); Edit However, upon closer review all of the JavaScript actions are referring to the getRowID 760 method, which typically returns the ID of the first column.

As previously stated, the closer the ID is to the JavaScript event, the more relevant is the event. Therefore the current step locates the closest element in the DOM to a JavaScript event that will uniquely distinguish between the Edit events.

Figure 8:
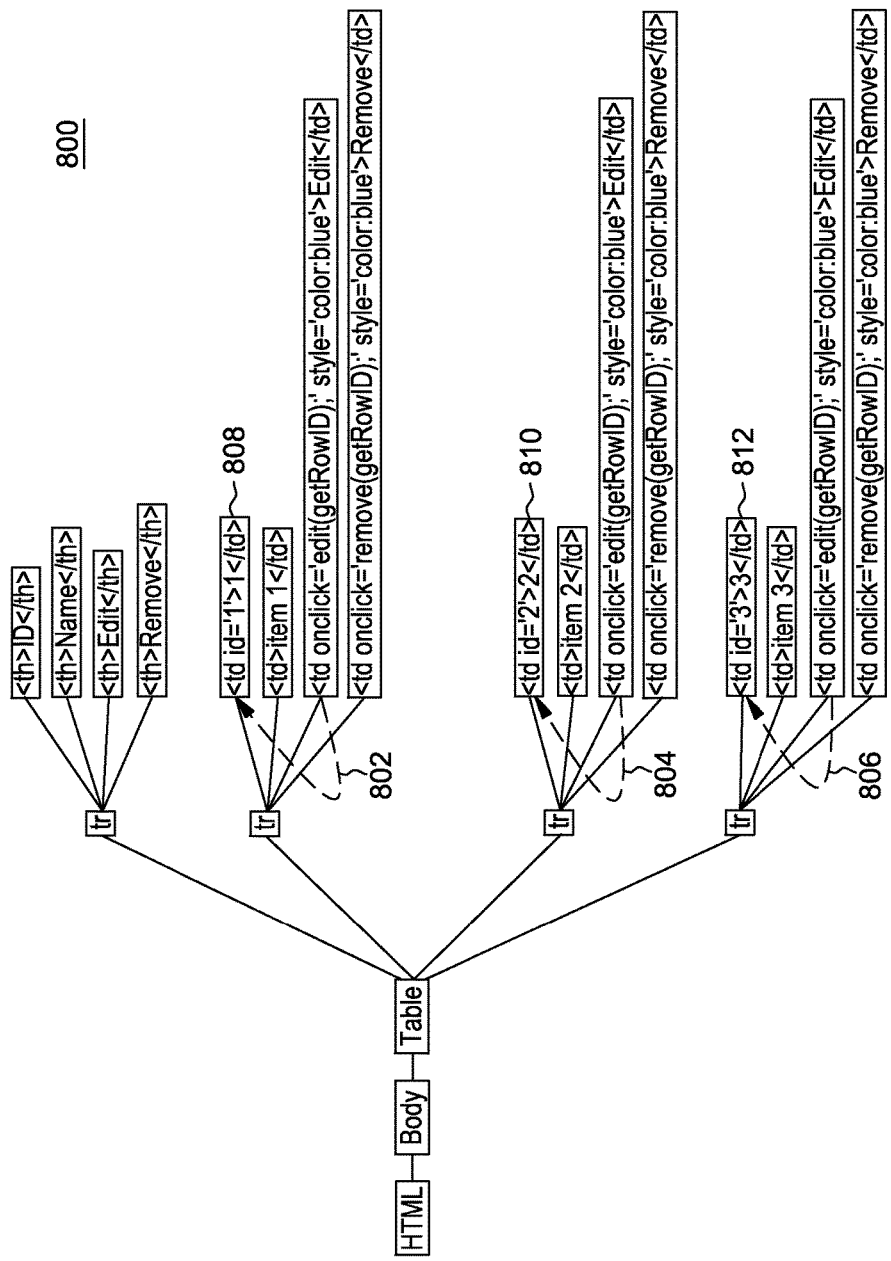
FIG. 8 is a block diagram representing a DOM structure for finding an Edit event of FIG. 7 in accordance with one embodiment of the disclosure.

With reference to FIG. 8 a block diagram representing a DOM structure for finding an Edit event of FIG. 7 operable for various embodiments of the disclosure is presented.

In example 800 the structure of the DOM is represented in a tree structure. Using step 2 of the previously recited process 500 of FIG. 5, the closest HTML node element that uniquely identifies each Edit JavaScript action is a cell that is obtained by traversing a relative path defined as: Node>>Parent>>first children. The path is highlighted by dotted lines 802, 804, and 806.

By applying the first step of previously recited process 500 and computing the Compute Node Characteristics ID(Node X) on every cell 708-710 in previous table 702 of FIG. 7 results in the following (elements 808, 810, and 812):
  1: td, id, 1, 1
  2: td, id, 2, 2
  3: td, id, 3, 3

To complete the computation of the IDs for the edit 708 actions of FIG. 7 all we need to do is concatenate the ids of the first cell to the ones of the edit cell and add the relative x path used to traverse the DOM:
  1: onclick, td, onclick, edit(getRowID); Edit, node>>parent>>children, td, id, 1, 1
  2: onclick, td, onclick, edit(getRowID); Edit, node>>parent>>children, td, id, 2, 2
  3: onclick, td, onclick, edit(getRowID); Edit, node>>parent>>children, td, id, 3, 3

The new IDs uniquely identify the edit on clicks. In a similar way, the unique IDs for the remove 710 on clicks of FIG. 7 will be computed as:
  1: onclick, td, onclick, remove(getRowID); Remove, node>>parent>>children, td, id, 1, 1
  2: onclick, td, onclick, remove(getRowID); Remove, node>>parent>>children, td, id, 2, 2
  3: onclick, td, onclick, remove(getRowID); Remove, node>>parent>>children, td, id, 3, 3

In the previous example the path, node>>parent>>children, length is 2. Continuing the example, the first node that is closest to the JavaScript event that will uniquely distinguish among the events that have the same ID is identified. A path of length 1 is shorter, however a path of length 1 is not sufficient to distinguish between the IDs that are created.

Figure 9:
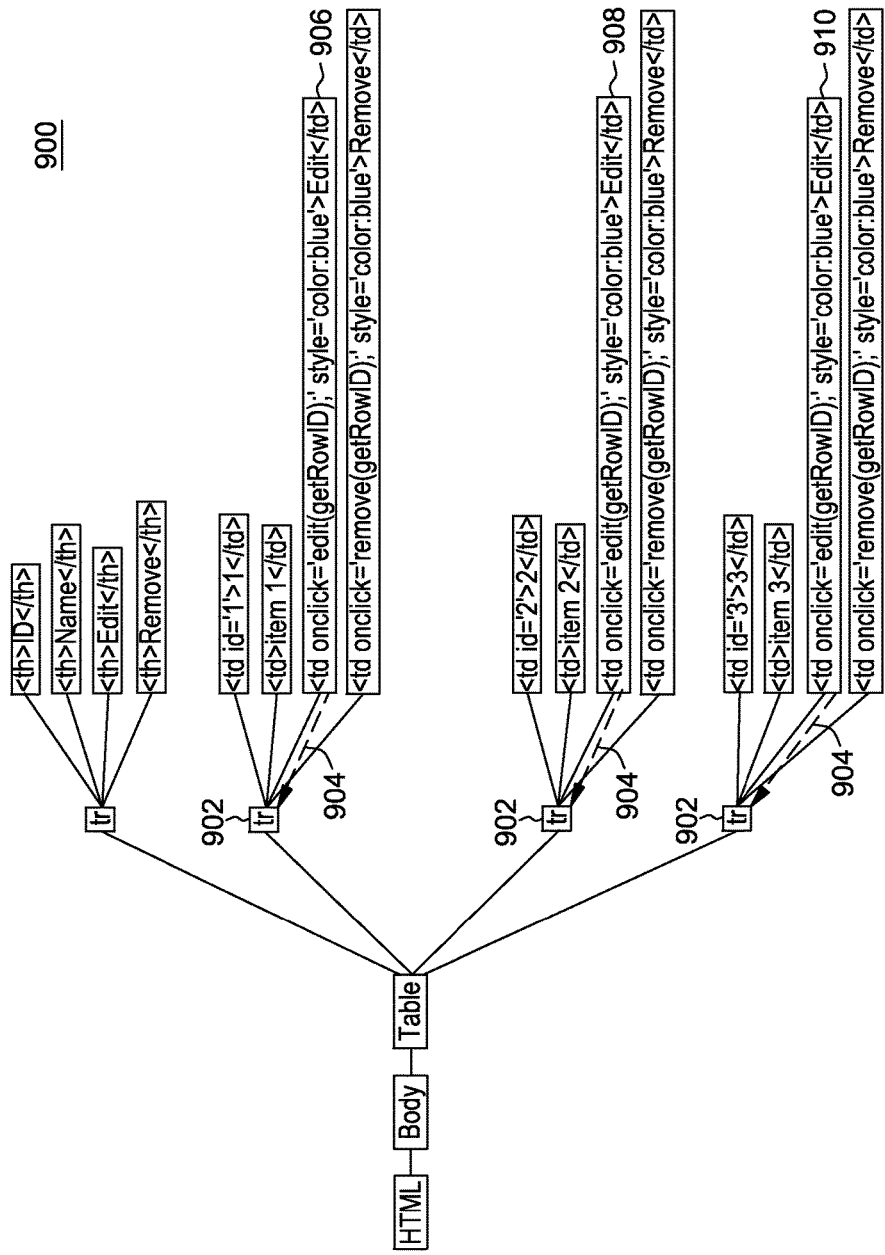
FIG. 9 is a block diagram representing a DOM structure representing a path node>parent the example of FIG. 8 in accordance with one embodiment of the disclosure.

With reference to FIG. 9 a block diagram of a DOM structure for indicating a path node>parent in the example of FIG. 8 operable for various embodiments of the disclosure is presented. Example 900 shows how the path node>parent is represented in path 904 of this case.

The following are computed IDs, when only the parent indicated as element 902 is included.
  1: onclick, td, onclick, remove(getRowID); Edit, node>>parent, tr
  2: onclick, td, onclick, remove(getRowID); Edit, node>>parent, tr
  3: onclick, td, onclick, remove(getRowID); Edit, node>>parent, tr Note however the computed IDs are the same for the edit actions 906-910. Accordingly a path of length 1 is not sufficient to distinguish between the IDs that are created.

Figure 10:
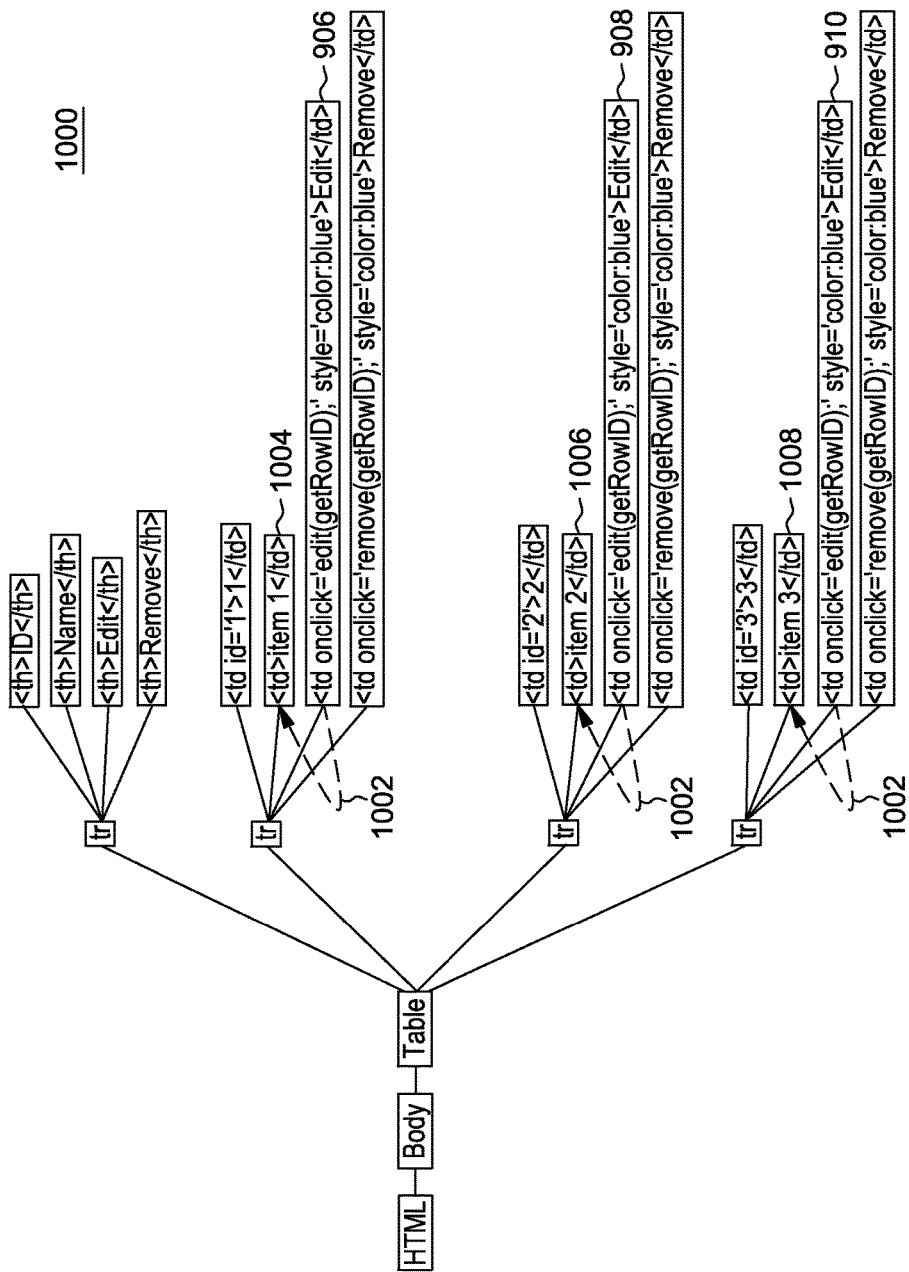
FIG. 10 is a block diagram representing a DOM structure for a path consideration of FIG. 9 using only the parent in accordance with one embodiment of the disclosure.

With reference to FIG. 10 a block diagram representing a DOM structure for a path consideration of FIG. 9 using the parent and sibling operable for various embodiments of the disclosure is presented.

The IDs are computed using a path 1002 of parent and sibling. Note however in this case the IDs computed including item HTML tag of elements 1004-1008 and the IDs are different.
  1: onclick, td, onclick, remove(getRowID); Edit, node>>parent>>children, td, item 1
  2: onclick, td, onclick, remove(getRowID); Edit, node>>parent>>children, td, item 2
  3: onclick, td, onclick, remove(getRowID); Edit, node>>parent>>children, td, item 3

Accordingly, selecting either the <td id='1'>1</td> or the <td>item 1</td> option can be performed. However, choosing the HTML element having the id attribute is stronger influence than choosing the HTML attribute with the item attribute rather than the id attribute, however both options work.

Figure 11:
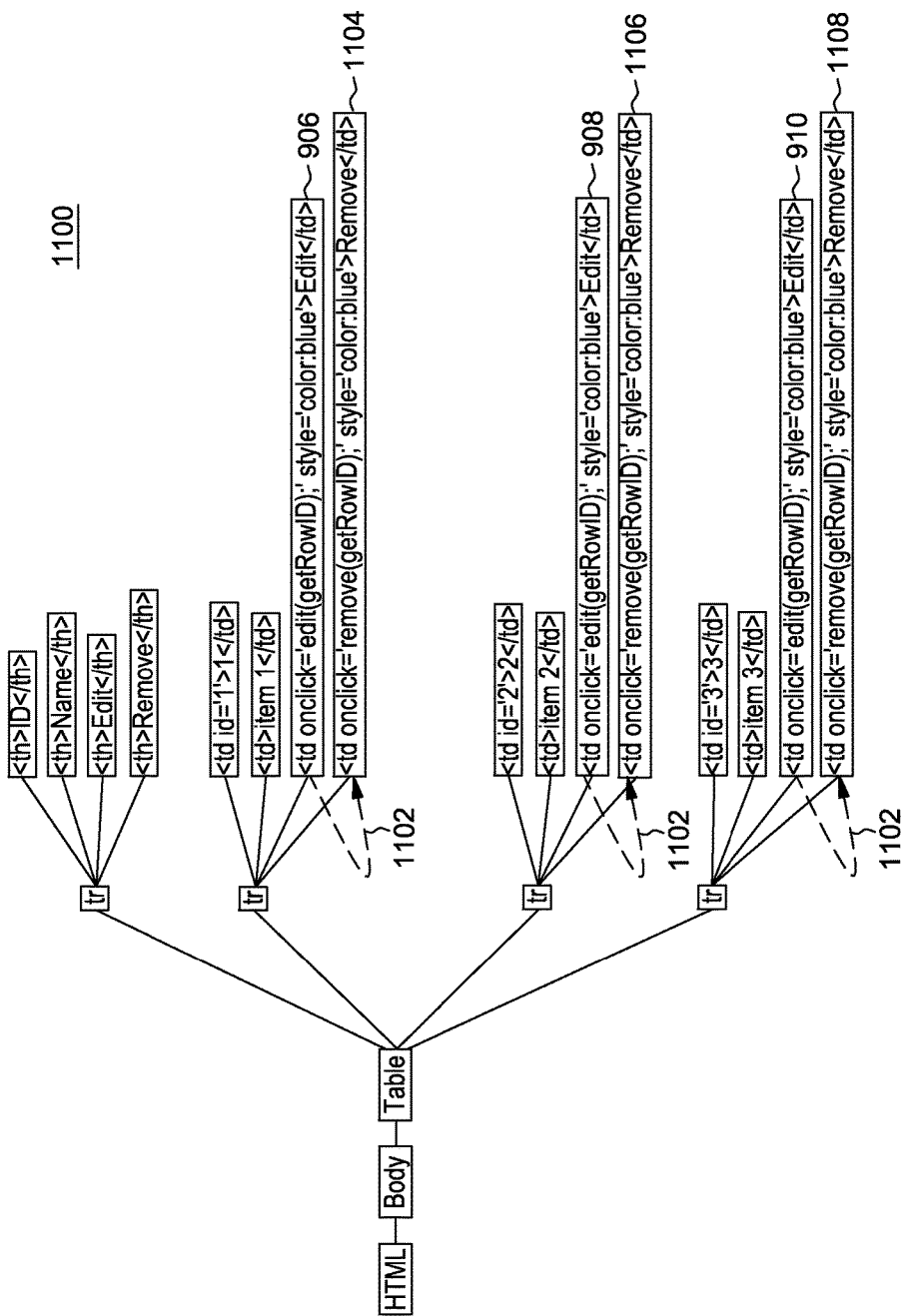
FIG. 11 is a block diagram representing a DOM structure for a path consideration of FIG. 9 using both parent and child in accordance with one embodiment of the disclosure.

With reference to FIG. 11 a block diagram representing a DOM structure for a path consideration of FIG. 9 using both parent and child operable for various embodiments of the disclosure is presented.

The IDs are computed using a path 1102 of parent and sibling. Note however in this case the IDs computed including edit actions 906-910 and remove actions 1104-1108 and the IDs computed are different.

Using this option, the IDs computed become identical:
1: onclick, td, onclick, edit(getRowID); Edit, node>>parent>>children, td, onclick, remove(getRowID); Remove,
2: onclick, td, onclick, edit(getRowID); Edit, node>>parent>>children, td, onclick, remove(getRowID); Remove,
3: onclick, td, onclick, edit(getRowID); Edit, node>>parent>>children, td, onclick, remove(getRowID); Remove, However selecting this option is not a good because the neighbor influence cannot be used to uniquely identify the edit events. In a similar manner, this path selection also cannot be used to uniquely identify the Remove events.

With reference to FIG. 12 a code snippet representing finding a closest HTML element that uniquely identifies a set of IDs using the JavaScript action identification system of FIG. 3 operable for various embodiments of the disclosure is presented.

To better understand the process of code snippet 1200 in statement 1202 the input provided to the process is:
1: onclick, td, onclick, edit(getRowID); Edit
2: onclick, td, onclick, edit(getRowID); Edit
3: onclick, td, onclick, edit(getRowID); Edit Statement 1204 indicates Node X is identified as being the node to which is initiated searching for a closest neighbor that will distinguish between the IDs. Statement 1206 indicates constructing a searching tree rooted in Node X using the current DOM tree.

Statement 1208 indicates using the search tree to do a breath first search, until locating a correct element. Each time an element is selected, the same path is traversed as in the original DOM for all JavaScript event IDs that are the same to determine whether the element selected helps to uniquely identify all JavaScript events that have the same ID. A stop condition for the breath first search can be when either one of the following conditions occurs: completion of traversing the tree and not locating an element to uniquely identify the JavaScript actions—in which case the JavaScript actions are considered to be the same (this is highly unlikely to happen); a certain predefined depth threshold in the searching tree is reached—in which case the JavaScript actions are considered to be the same (depending on the threshold this may happen, but the process is not to go further); and an element that helps distinguish the JavaScript actions among each other is located.

Statement 1210 indicates the $ID_{JavaScript}$=Compute JavaScript Action Characteristics ID(JavaScript Action X) is exactly the same ID for all the given JavaScript Actions. In this example the ID is based on Node X, but the ID could be computed for any of the other nodes, and the result would be the same. In general in a first step the function can be implemented to require Node W to contain an id attribute, otherwise the output of that function would be null. In both the first step and a second step the hashing function is optional, but recommended because of significant reductions in both space required and execution time for the disclosed process.

Figure 13:
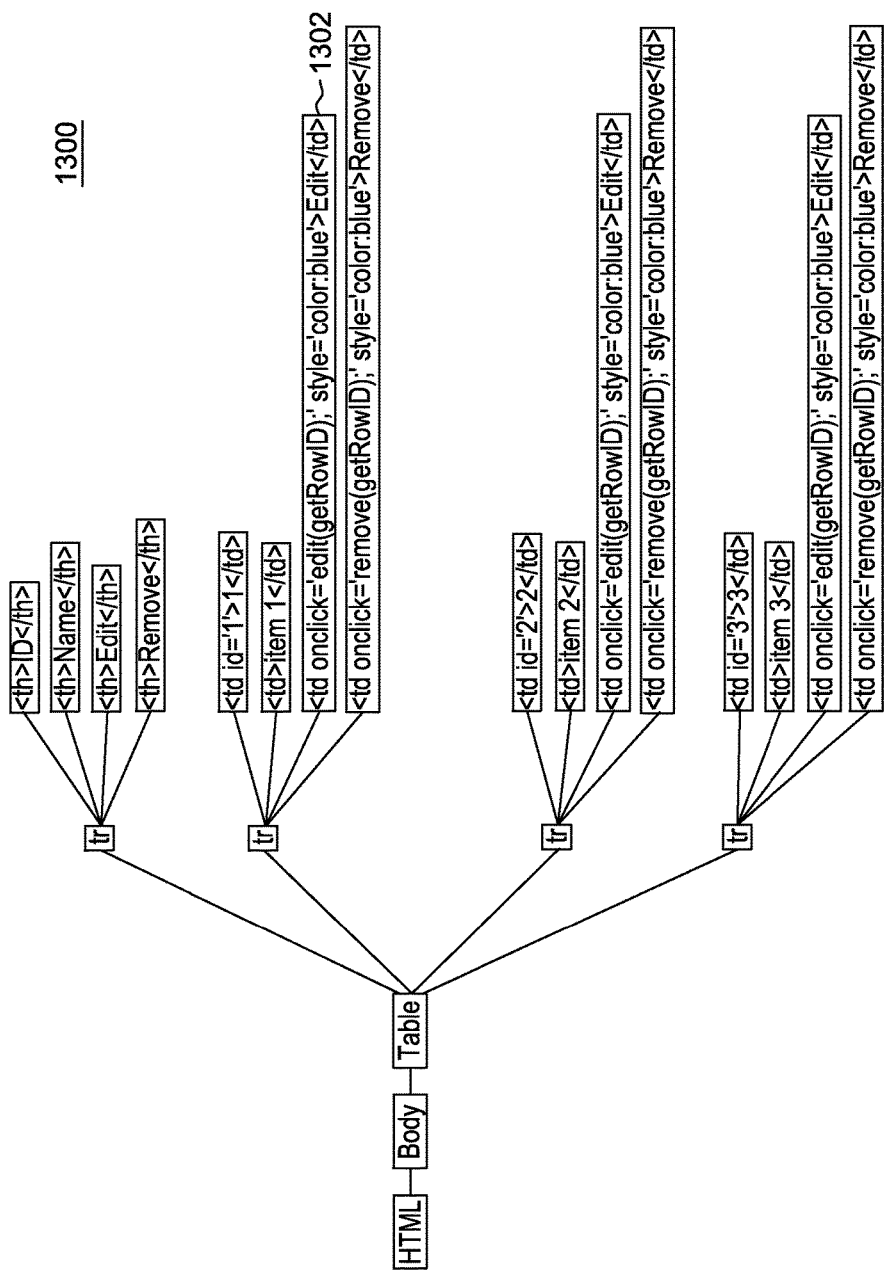
FIG. 13 is a block diagram representing searching tree using a DOM structure in accordance with one embodiment of the disclosure.

With reference to FIG. 13 a block diagram representing a search tree using a DOM structure in accordance with one embodiment of the disclosure is presented. Example 1300 depicts a selection of Node X is identified as being the node to which is initiated searching for a closest neighbor that will distinguish between the IDs represented as element 1302.

Figure 14:
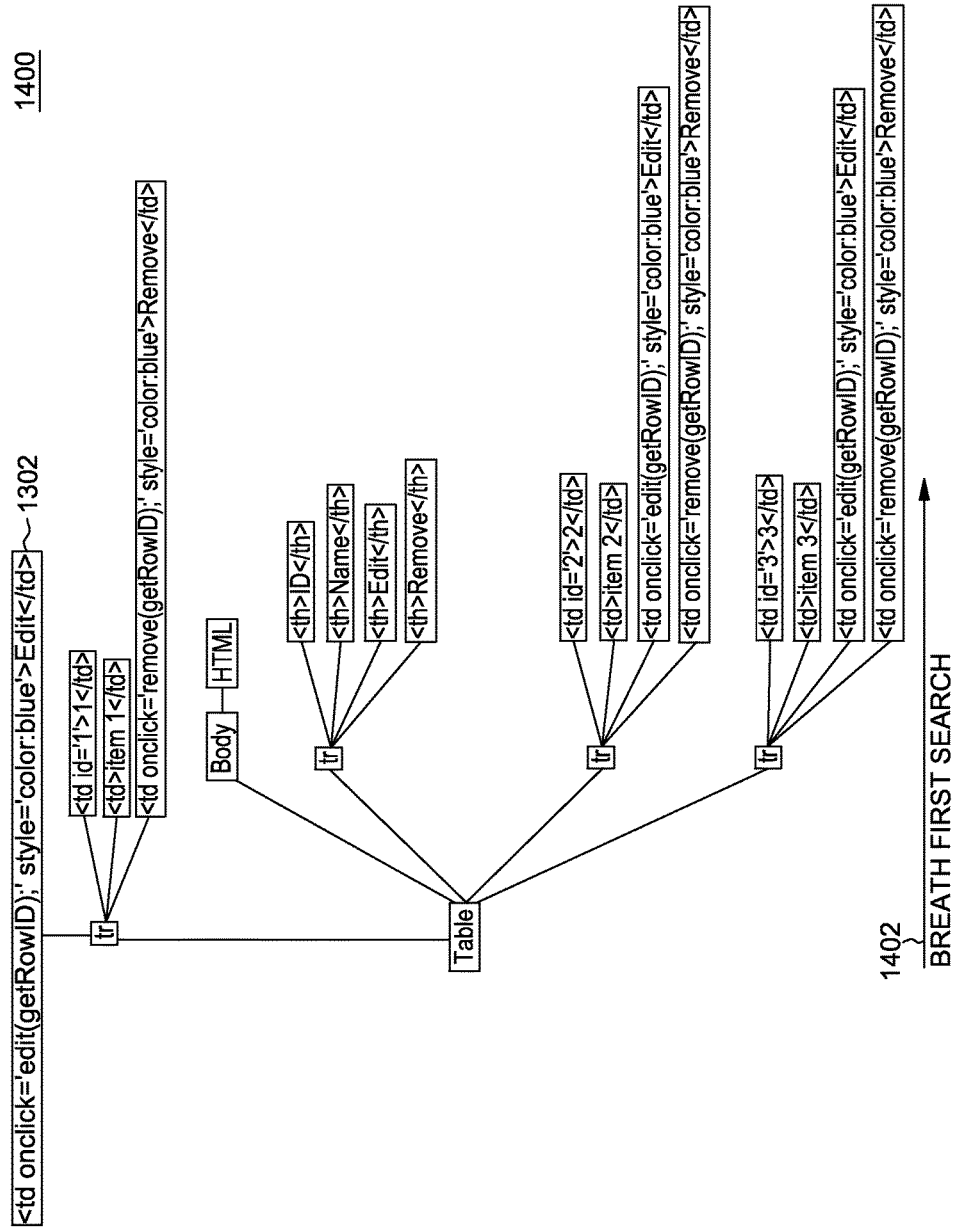
FIG. 14 is a block diagram representing searching tree using a DOM structure of FIG. 13 in a breadth first search in accordance with one embodiment of the disclosure.

With reference to FIG. 14 a block diagram representing a search tree using a DOM structure of FIG. 13 in a breadth first search in accordance with one embodiment of the disclosure is presented.

Breadth first search 1402 is initiated using element 1302 from the search tree of example 1300 of FIG. 13.

Figure 15:
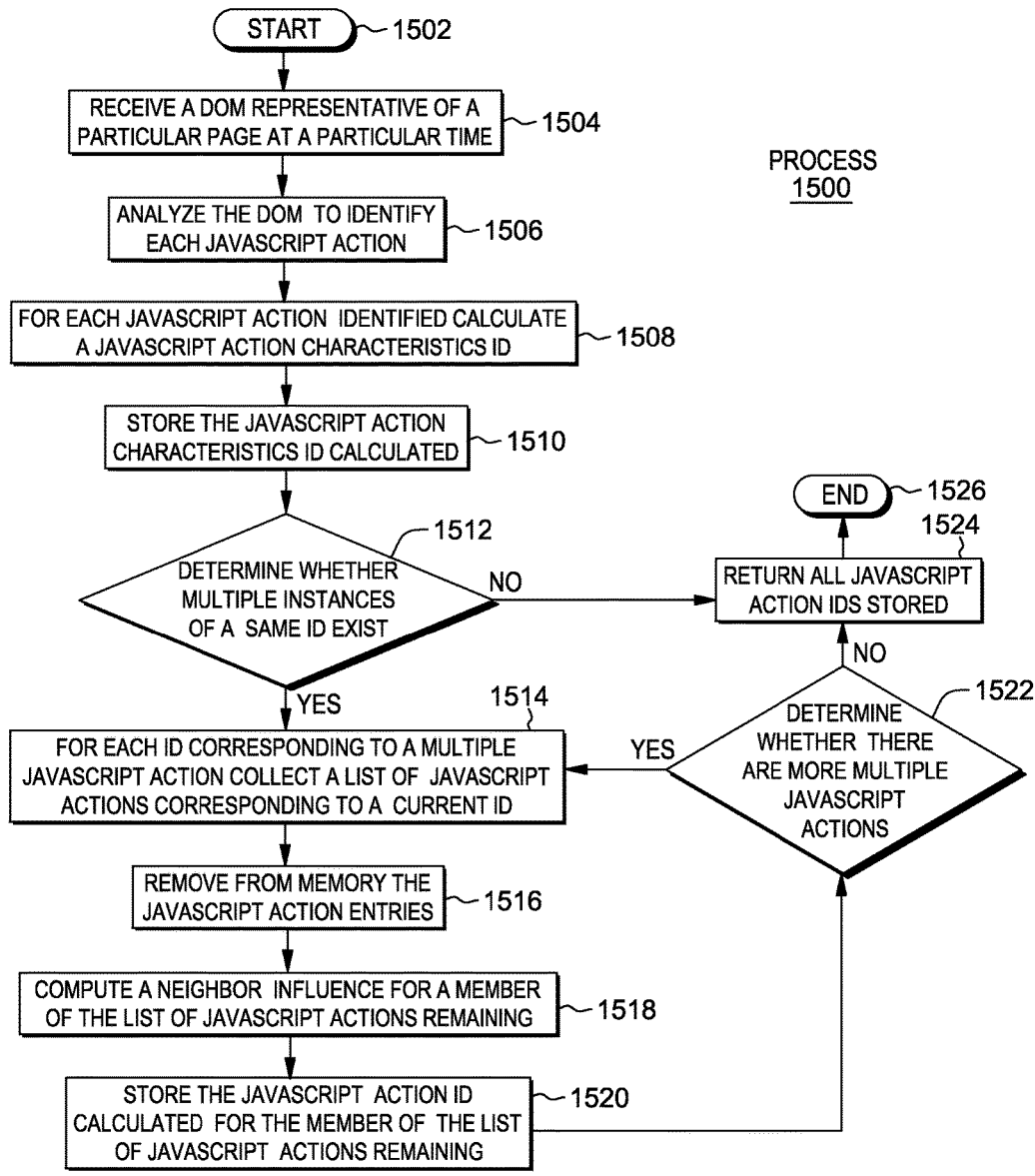
FIG. 15 is a flowchart of a process to uniquely identify elements containing JavaScript actions in time using the JavaScript action identification system of FIG. 3 in accordance with one embodiment of the disclosure.

With reference to FIG. 15 a flowchart of a process to uniquely identify elements containing JavaScript actions in time in accordance with one embodiment of the disclosure is presented. Process 1500 is an example of using the JavaScript action identification system 116 of FIG. 3.

Process 1500 begins (step 1502) and receives a DOM representative of a particular page at a particular time (step 1504). Process 1500 analyzes the DOM to identify each JavaScript action (step 1506). Each JavaScript action located on the particular page at a particular time being analyzed is accordingly identified.

For each JavaScript action identified, process 1500 calculates a JavaScript action characteristics ID (step 1508). Process 1500 stores each of the JavaScript action characteristics ID calculated (step 1510). Storing each JavaScript action characteristics ID calculated places the calculation result in a memory for subsequent use as an intermediate result by the process.

Process 1500 determines whether multiple instances of a same ID exist (step 1512). Multiple instances of same ID may exist within the intermediate results. In response to a determination no multiple instances of a same ID exist, process 1500 returns all JavaScript action IDs stored (step 1524) and terminates thereafter (step 1526).

In response to a determination multiple instances of a same ID exist, process 1500 collects, for each ID corresponding to a multiple JavaScript action, a list of JavaScript actions corresponding to the current ID (step 1514). Process 1500 removes from memory the JavaScript action entries (step 1516). Process 1500 computes a neighbor influence for a member of the list of JavaScript actions (step 1518). Only one member remains when stored because each member was a duplicate.

Process 1500 stores the JavaScript action ID calculated (step 1520). Process 1500 determines whether there are more multiple JavaScript actions (step 1522). In response to a determination there are more multiple JavaScript actions, process 1500 returns to perform step 1514 as before. In response to a determination there are no more multiple JavaScript actions, process 1500 performs step 1524 as before and terminates thereafter.

Thus is presented in an illustrative embodiment a computer-implemented method for tracking JavaScript actions in a rich Internet application. The computer-implemented method receives as an input a document object model of a current web page as a portion of the rich Internet application and returns an identifier of each JavaScript action of the current web page, wherein the identifier of each JavaScript action on the current web page is computed using characteristics of an associated element.

The method further determines whether the identifier returned for a respective JavaScript action uniquely identifies the JavaScript action and responsive to a determination that the identifier returned for the respective JavaScript action does not uniquely identify the JavaScript action, uses neighbor influences to compute the unique identifier.

Using the neighbor influences further comprises identifying a closest node to a particular JavaScript action. The closest node in the document object model to the particular JavaScript action is more relevant in distinguishing between identifiers returned for respective JavaScript actions that do not uniquely identify respective JavaScript actions. A relative path from a current node to a parent to a first child, is traversed until one of the following is true: traversal of a respective tree is complete without identifying an element that uniquely identifies the JavaScript actions, wherein the JavaScript actions are considered to be the same; a certain predefined depth threshold in the searching tree is reached, wherein the JavaScript actions are considered to be the same; and an element that distinguishes the JavaScript actions from among other JavaScript actions is identified.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, and DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method for dynamically tracking of JavaScript actions in different document object models, the computer-implemented method comprising:
    receiving a first document object model (DOM) representative of a first particular page of an application at a first particular time;
    analyzing the first DOM received to identify each JavaScript action on the particular page;
    calculating, for each JavaScript action identified, a JavaScript action characteristics ID based on one or more JavaScript action attribute names and one or more respective computed node characteristics identifiers;
    storing to memory, the JavaScript action characteristics ID and associated JavaScript action;
    determining whether multiple instances of a same JavaScript action exist, using the JavaScript action characteristics ID;
    responsive to a determination of multiple instances of the same JavaScript action exist, for each of the JavaScript action characteristics ID corresponding to a multiple JavaScript action, collecting a list of the JavaScript actions corresponding to a current JavaScript action characteristics ID;
    removing from memory, JavaScript action entries for the multiple instances of the same JavaScript action characteristics ID and a same neighbor influence;
    computing the neighbor influence for members of the list of JavaScript actions to uniquely distinguish between the JavaScript actions comprising the list of JavaScript actions, wherein computing the neighbor influence for a member of the list of JavaScript actions remaining further comprises:
        identifying a node as being the node to which is initiated searching for a closest neighbor that will distinguish between the JavaScript actions;
        constructing a search tree rooted in the node identified using a current DOM tree;
        using the search tree to perform a breadth first search, until locating a correct element, wherein each time an element is selected, a same path is traversed as in the current DOM tree for all of the JavaScript action entries that are identical to determine whether the element selected uniquely identifies all of the JavaScript action entries that have a same JavaScript action characteristics ID and wherein a stop condition for the breadth first search is one of:
- completion of traversing the search tree and not locating an element to uniquely identify the JavaScript action entries in which case the JavaScript action entries are considered to be the same;
- a predefined depth threshold in the search tree is reached in which case the JavaScript action entries are considered to be the same in which case the breadth first search does not proceed; and
- an element that helps distinguish the JavaScript action entries from each other is located;

storing to memory, the JavaScript action characteristics ID and the associated JavaScript action wherein the JavaScript action characteristics ID is calculated for the members of the list of JavaScript actions remaining;

determining whether there are more multiple JavaScript actions;

responsive to a determination there are no more multiple JavaScript actions, returning all of the JavaScript action characteristics ID and the associated JavaScript action stored;

receiving a second DOM representative of a second particular page of the application at a second particular time; and comparing the returned JavaScript action characteristics IDs and the associated JavaScript actions of the first DOM with the JavaScript action characteristics IDs and the associated JavaScript actions of the second DOM and outputting matching JavaScript actions based on the comparison.

2. The computer-implemented method of claim 1 wherein calculating, for each JavaScript action identified, a JavaScript action characteristics ID further comprises:
- receiving a name of an element, wherein the name is also known as a markup language tag name;
- looping though a list of stable attributes to identify a set of attributes corresponding to attributes associated with the element; and
- generating the JavaScript action characteristics ID as a string of a predefined format comprising an identifier associated with the particular JavaScript action identified on a web page in combination with one or more JavaScript action attribute names and the one or more respective computed node characteristics identifiers, in which elements of the string are separated by predefined delimiters.

3. The computer-implemented method of claim 2 further comprising:
- generating a computed node characteristics identifier, wherein the computed node characteristics identifier is a string of a predefined format comprising an identifier associated with each particular markup language tag identified on a web page in combination with one or more stable attribute names and one or more respective stable attribute values, in which all elements of the string are separated by predefined delimiters.

4. The computer-implemented method of claim 1 further comprising hashing at least one of the JavaScript action characteristics ID and the associated JavaScript action stored using a hash function implemented using any type of hashing mechanism including MD5, and checksum.

5. The computer-implemented method of claim 1 wherein constructing a search tree rooted in the node identified using a current DOM tree further comprises:
- generating a binary tree data structure suitable for searching, wherein
- the binary tree data structure stores data values from an ordered set of data values, derived from the current DOM; and
- performing an in-order traversal of the tree to visit each of the nodes in ascending order of the stored values.

6. The computer-implemented method of claim 1 wherein the neighbor influence is representative of relevance of an element to another element through use of relative positioning in direct proportion with proximity to the element that is a target for unique identification on the particular page in which further away from the element, indicates less relevant information is with respect to the element.

7. A computer program product for tracking JavaScript actions in different document object models, the computer program product comprising:
- a computer readable storage device containing computer executable program code stored thereon, the computer executable program code comprising:
  - computer executable program code for receiving a first document object model (DOM) representative of a first particular page of an application at a first particular time;
  - computer executable program code for analyzing the first DOM received to identify each JavaScript action on the particular page;
  - computer executable program code for calculating, for each JavaScript action identified, a JavaScript action characteristics ID based on one or more JavaScript action attribute names and one or more respective computed node characteristics identifiers;
  - computer executable program code for storing to memory, the JavaScript action characteristics ID and associated JavaScript action;
  - computer executable program code for determining whether multiple instances of a same JavaScript action exist, using the JavaScript action characteristics ID;
  - computer executable program code responsive to a determination of multiple instances of the same JavaScript action exist, for each of the JavaScript action characteristics ID corresponding to a multiple JavaScript action, collecting a list of the JavaScript actions corresponding to a current JavaScript action characteristics ID;
  - computer executable program code for removing from memory, JavaScript action entries for the multiple instances of the same JavaScript action characteristics ID and a same neighbor influence;
  - computer executable program code for computing the neighbor influence for members of the list of JavaScript actions to uniquely distinguish between the JavaScript actions comprising the list of JavaScript actions, wherein computer executable program code for computing the neighbor influence for a member of the list of JavaScript actions remaining further comprises:
    - computer executable program code for identifying a node as being the node to which is initiated searching for a closest neighbor that will distinguish between the JavaScript actions;

computer executable program code for constructing a search tree rooted in the node identified using a current DOM tree;

computer executable program code for using the search tree to perform a breadth first search, until locating a correct element, wherein each time an element is selected, a same path is traversed as in the current DOM tree for all of the JavaScript action entries that are identical to determine whether the element selected uniquely identifies all of the JavaScript action entries that have a same JavaScript action characteristics ID and wherein a stop condition for the breadth first search is one of:

completion of traversing the search tree and not locating an element to uniquely identify the JavaScript action entries in which case the JavaScript action entries are considered to be the same;

a predefined depth threshold in the search tree is reached in which case the JavaScript action entries are considered to be the same in which case the breadth first search does not proceed; and an element that helps distinguish the JavaScript action entries from each other is located;

computer executable program code for storing to memory, the JavaScript action characteristics ID and the associated JavaScript action wherein the JavaScript action characteristics ID is calculated for the members of the list of JavaScript actions remaining;

computer executable program code for determining whether there are more multiple JavaScript actions;

computer executable program code responsive to a determination there are no more multiple JavaScript actions, for returning all of the JavaScript action characteristics ID and the associated JavaScript action stored;

computer executable program code for receiving a second DOM representative of a second particular page of the application at a second particular time; and computer executable program code for comparing the returned JavaScript action characteristics IDs and the associated JavaScript actions of the first DOM with the JavaScript action characteristics IDs and the associated JavaScript actions of the second DOM and outputting matching JavaScript actions based on the comparison.

8. The computer program product of claim 7 wherein computer executable program code for calculating, for each JavaScript action identified, a JavaScript action characteristics ID further comprises:

computer executable program code for receiving a name of an element, wherein the name is also known as a markup language tag name;

computer executable program code for looping though a list of stable attributes to identify a set of attributes corresponding to attributes associated with the element; and computer executable program code for generating the JavaScript action characteristics ID as a string of a predefined format comprising an identifier associated with the particular JavaScript action identified on a web page in combination with one or more JavaScript action attribute names and the one or more respective computed node characteristics identifiers, in which elements of the string are separated by predefined delimiters.

9. The computer program product of claim 8 further comprising:

computer executable program code for generating a computed node characteristics identifier, wherein the computed node characteristics identifier is a string of a predefined format comprising an identifier associated with each particular markup language tag identified on a web page in combination with one or more stable attribute names and one or more respective stable attribute values, in which all elements of the string are separated by predefined delimiters.

10. The computer program product of claim 7 further comprising:

computer executable program code for hashing at least one of the JavaScript action characteristics ID and the associated JavaScript action stored a hash function implemented using any type of hashing mechanism including MD5, and checksum.

11. The computer program product of claim 7 wherein computer executable program code for constructing a search tree rooted in the node identified using a current DOM tree further comprises:

computer executable program code for generating a binary tree data structure suitable for searching, wherein the binary tree data structure stores data values from an ordered set of data values, derived from the current DOM; and computer executable program code for performing an in-order traversal of the tree to visit each of the nodes in ascending order of the stored values.

12. The computer program product of claim 7 wherein the neighbor influence is representative of relevance of an element to another element through use of relative positioning in direct proportion with proximity to the element that is a target for unique identification on the particular page in which further away from the element, indicates less relevant information is with respect to the element.

13. An apparatus for dynamically tracking of JavaScript actions in different document object models, the apparatus comprising:

a communications fabric;

a memory connected to the communications fabric, wherein the memory contains computer executable program code;

a communications unit connected to the communications fabric;

an input/output unit connected to the communications fabric;

a display connected to the communications fabric; and a processor unit connected to the communications fabric, wherein the processor unit executes the computer executable program code to direct the apparatus to:

receive a document object model (DOM) representative of a particular page of an application at a particular time;

analyze the DOM received to identify each JavaScript action on the particular page;

calculate, for each JavaScript action identified, a JavaScript action characteristics ID based on one or more JavaScript action attribute names and one or more respective computed node characteristics identifiers;

store to memory, the JavaScript action characteristics ID and associated JavaScript action;

determine whether multiple instances of a same JavaScript action exist, using the JavaScript action characteristics ID;

responsive to a determination of multiple instances of the same JavaScript action exist, for each of the JavaScript action characteristics ID corresponding to a multiple JavaScript action, collecting a list of the JavaScript actions corresponding to a current JavaScript action characteristics ID;

remove from memory, JavaScript action entries for the multiple instances of the same JavaScript action characteristics ID and a same neighbor influence;

compute the neighbor influence, for members of the list of JavaScript actions to uniquely distinguish between the JavaScript actions comprising the list of JavaScript actions, wherein the processor unit executes the computer executable program code to compute the neighbor influence for a member of the list of JavaScript actions remaining further directs the apparatus to:
  identify a node as being the node to which is initiated searching for a closest neighbor that will distinguish between the JavaScript actions;
  construct a search tree rooted in the node identified using a current DOM tree;
  use the search tree to perform a breadth first search, until locating a correct element, wherein each time an element is selected, a same path is traversed as in the current DOM tree for all of the JavaScript action entries that are identical to determine whether the element selected uniquely identifies all of the JavaScript action entries that have a same JavaScript action characteristics ID and wherein a stop condition for the breadth first search is one of:
    completion of traversing the search tree and not locating an element to uniquely identify the JavaScript action entries in which case the JavaScript action entries are considered to be the same;
    a predefined depth threshold in the search tree is reached in which case the JavaScript action entries are considered to be the same in which case the breadth first search does not proceed; and
    an element that helps distinguish the JavaScript action entries from each other is located;
store to memory, the JavaScript action characteristics ID and the associated JavaScript action wherein the JavaScript action characteristics ID is calculated for the members of the list of JavaScript actions remaining;

determine whether there are more multiple JavaScript actions; and responsive to a determination there are no more multiple JavaScript actions, return all of the JavaScript action characteristics ID and the associated JavaScript action stored;

receive a second DOM representative of a second particular page of the application at a second particular time; and compare the returned JavaScript action characteristics IDs and the associated JavaScript actions of the first DOM with the JavaScript action characteristics IDs and the associated JavaScript actions of the second DOM and outputting matching JavaScript actions based on the comparison.

14. The apparatus of claim 13 wherein the processor unit executes the computer executable program code to calculate, for each JavaScript action identified, a JavaScript action characteristics ID further directs the apparatus to:
  receive a name of an element, wherein the name is also known as a markup language tag name;
  loop though a list of stable attributes to identify a set of attributes corresponding to attributes associated with the element; and
  generate the JavaScript action characteristics ID as a string of a predefined format comprising an identifier associated with the particular JavaScript action identified on a web page in combination with one or more JavaScript action attribute names and the one or more respective computed node characteristics identifiers, in which elements of the string are separated by predefined delimiters.

15. The apparatus of claim 14 wherein the processor unit executes the computer executable program code to further direct the apparatus to:
  generate a computed node characteristics identifier, wherein the computed node characteristics identifier is a string of a predefined format comprising an identifier associated with each particular markup language tag identified on a web page in combination with one or more stable attribute names and one or more respective stable attribute values, in which all elements of the string are separated by predefined delimiters.

16. The apparatus of claim 13 wherein the processor unit executes the computer executable program code to construct a search tree rooted in the node identified using a current DOM tree further directs the apparatus to:
  generate a binary tree data structure suitable for searching, wherein
  the binary tree data structure stores data values from an ordered set of data values, derived from the current DOM; and
  perform an in-order traversal of the tree to visit each of the nodes in ascending order of the stored values.

17. The apparatus of claim 13 wherein the neighbor influence is representative of relevance of an element to another element through use of relative positioning in direct proportion with proximity to the element that is a target for unique identification on the particular page in which further away from the element, indicates less relevant information is with respect to the element.

* * * * *